United States Patent Office 3,417,549
Patented Dec. 24, 1968

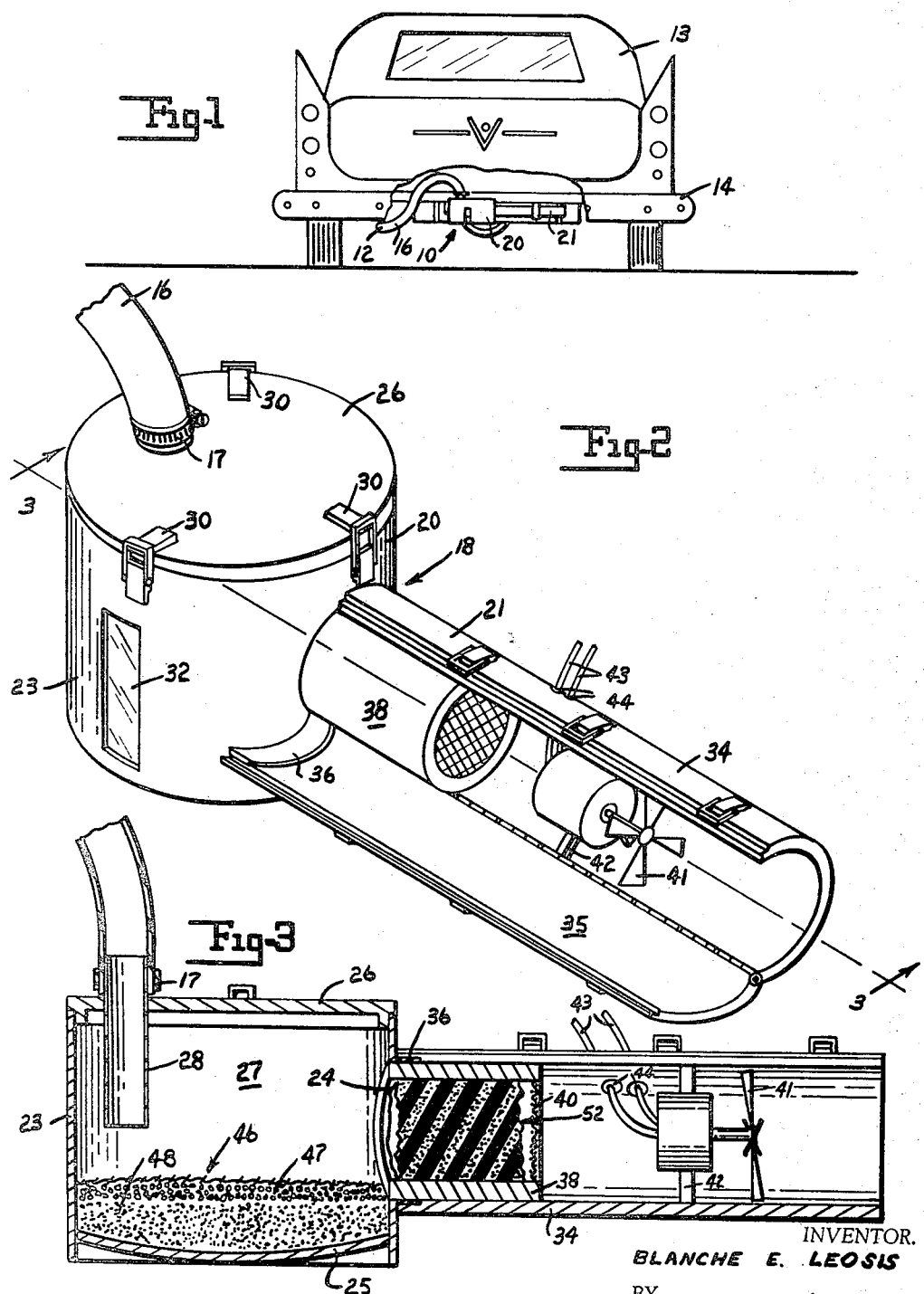

3,417,549
EXHAUST FILTER DEVICE
Blanche E. Leosis, 1748 Evergreen Ave.,
Walla Walla, Wash. 99362
Filed Aug. 21, 1967, Ser. No. 662,047
6 Claims. (Cl. 55—316)

ABSTRACT OF THE DISCLOSURE

An exhaust filter device for internal combustion engines is described that removes the moisture, particles, fumes, and smoke from the exhaust. The device is such that it may be attached to the end of an automobile tailpipe. A filter having a mixture of granulated bentonite clay and activated charcoal is provided upstream of a filter containing natural sponge treated with lightweight oil. An exhaust fan is mounted downstream of the filters for drawing the exhaust through the filters without providing a back pressure on the engine.

Background of the invention

This invention relates to exhaust filter devices and more particularly to exhaust filter devices for attachment to the exhaust system of internal combustion engines to remove the particles, moisture, fumes and smoke from the exhaust to help eliminate the pollution of the atmosphere.

In the past, various types of devices have been developed to treat exhaust gases such as those emitted from automobiles. However, it appears that none of them are totally satisfactory. Many of the devices are designed to replace the automobile muffler. To do this, the old muffler must be removed and the exhaust filter devices installed in its place. This is a comparatively expensive task which most car owners are reluctant to do because the installment costs represent a substantial increase over the initial cost of the exhaust filter device. Furthermore, in order to change the filters in the device the automobile must be jacked up sufficiently to provide adequate access to the device. Very few automobile owners have such facilities for efficiently changing the filters in such devices.

A further disadvantage with most exhaust filter devices is that they create a back pressure on the engine exhaust that reduces the efficiency of the engine and increases the temperature of the exhaust making it more likely that the exhaust valves of the engine will become burned. To solve this problem one solution proposed has been to provide a fan in the exhaust filter device to blow the exhaust through the filter therein. However, this is not totally satisfactory because the fan becomes clogged with exhaust sludge and rusts from the moisture carried by the exhaust.

An additional problem associated with most exhaust filter devices is that they do not have economical provisions for indicating when the filter becomes ineffective. One suggestion has been to provide a damper system downstream in the filter that responds to the amount of exhaust flowing through the device and has provisions for indicating when the flow is curtailed. However, the problem with such a system is that it is impossible to tell if the filter is clogged when the engine is not running. It is frequently advantageous to know the condition of the filter when the engine is not running so that the filter may be changed before starting the engine.

Another principal disadvantage with most exhaust filter devices is that they do not effectively remove the particles, moisture and smoke from the exhaust fumes. One of the principal reasons for this is that the filters are inadequate.

A universal complaint is that the exhaust filter devices are too expensive to construct to be able to market the devices for mass acceptance.

One of the principal objects of this invention is to provide an exhaust filter device that may be readily attached to the tailpipe without having to remove or tamper with any part of the exhaust system and without causing back pressure to occur after it is attached.

Another important advantage of this invention is to provide an exhaust filter device that will effectively remove almost all of the particles, moisture and smoke from the exhaust.

A further object of this invention is to provide a means for readily visually determining when the filter in the device becomes ineffective.

An additional object is to provide an exhaust filter device that is economical to construct and maintain and which contains filter material that is efficient and inexpensive to replace with the minimum of effort.

These and other advantages and objects of this invention will become apparent upon reading the following description of the preferred embodiment of this invention.

Brief description of the drawings

A preferred embodiment is illustrated in the accompanying drawings, in which:

FIG. 1 is a cut away schematic view of the rear end of an automobile showing an exhaust filter device embodying the principles of this invention mounted to the frame of a car immediately in front of the back bumper;

FIG. 2 is a perspective view of the exhaust filter device showing the device partly open to expose the interior of a section of the device; and FIG. 3 is a vertical cross sectional view taken along line 3—3 in FIG. 2 showing the interior of the device particularly emphasizing the filter elements.

Disclosure of the preferred embodiment

This invention concerns an exhaust filter device 10 for attachment to the exhaust system of an internal combustion engine. This preferred embodiment is directed to an exhaust filter device 10 that may be conveniently attached to the tailpipe 12 of the exhaust system of an automobile 13. The device 10 may be readily and conveniently mounted to the frame immediately forward of the back bumper 14 as shown in FIG. 1.

A flexible hose 16 which is part of the device 10 extends to and covers the end of the tailpipe. The hose 16 may be secured to the tailpipe by an appropriate clamp. The flexible hose 16 is attached to the main portion of the device 10 by a hose clamp 17.

The device 10 has a housing 18 that has a first section 20 and a second section 21 that are interconnecting. The first housing section 20 has a vertical cylindrical wall 23 with a side opening 24 for communicating with the second section 21. The first section 20 has a concave bottom 25 and a cap 26 removably mounted thereon for forming an enclosed compartment 27. An intake tube 28 is vertically mounted through the cap 26 for projecting the exhaust fumes downwardly toward the concave bottom 25. The intake tube 28 is offset from the center of the first section for directing the fumes downwardly to the bottom so that the concave bottom will deflect the fumes along the bottom and upwardly adjacent the side opening 24.

Pressure latches 30 of the trunk or suitcase type are mounted between the cap and the cylindrical wall 23 for holding the cap to the cylindrical wall to facilitate access to the compartment 27 when desired while preventing leakage when the latches are fastened.

A transparent window 32 is formed in the side of the cylindrical wall 23 to permit the viewer to see the interior of the first section.

The second housing section 21 has a horizontal cylindrical wall 34 with one end affixed to the cylindrical wall 23 circumscribing the side opening 24. The cylindrical wall 34 has a hinged door sector 35 that may be pivoted downwardly to expose the interior of the cylindrical wall 34. Seals 36 are mounted along the edge of the hinged door 35 to prevent leakage of the exhaust fumes. Pressure latches of the trunk or suitcase type are mounted between the hinge and the cylindrical wall for securely holding the door closed. A filter housing 38 is concentrically mounted within one end of the cylindrical wall 34 and extends to the interior of the compartment 27. A large mesh screen 40 is mounted in the downstream end of the tube 38 to prevent filter material from flowing therethrough.

A fan 41 with an associated motor is mounted within the second section 21 downstream of the tube 38. The fan 41 is supported by mounting bracket 42. The electrical wires 43 of the fan motor extend through resilient grommets 44 mounted within the wall 34. The electrical wires may be connected to the ignition circuit so that the fan will operate when the engine is running.

A filter 46 is mounted in the first compartment 27 for removing the moisture, particles, odors and fumes from the exhaust. The filter is composed of dry granulated bentonite clay 48 that is mounted beneath granulated activated charcoal 47. The bentonite clay and activated charcoal are contained in a flexible porous container such as cheese cloth to prevent the filter material from being blown about the compartment 27.

A filter 52 is mounted within the filter tube 38 to remove the smoke from the exhaust. The filter 52 is also capable of removing any additional particles that may remain in the exhaust. The filter 52 is composed of a cellulose acetate sponge or natural sponge which is lightly oiled with an animal oil or vegetable oil to capture the smoke from the exhaust. A suitable animal oil is lanum oil.

During the operation of the filter device 10 the exhaust fumes are drawn by the fan 41 from the tailpipe of the automobile through the filters 46 and 52 in a series arrangement. As may be particularly seen in FIG. 3, the exhaust is directed downwardly through the intake tube 28 toward the concave bottom 25. The exhaust is directed through the bentonite clay and the granulated activated charcoal along the bottom of the compartment 27 and then from the compartment 27 through the side opening 24. The bentonite clay removes the moisture and odor from the exhaust while the granulated activated charcoal removes the gas fumes from the exhaust. The concave bottom 25 acts as a deflector so that the exhaust has ample exposure to the filter material. The exhaust is drawn from the first compartment 27 through the sponge filter 52 where the smoke from the exhaust is retained in the filter. After the exhaust passes through the filter 52 it is ejected into the atmosphere at the downstream end of the cylindrical wall 34. By the time the exhaust has passed through the first and second filter the moisture and sludge particle material has been removed from the exhaust so that it will not rust or foul up the fan 41.

After considerable use bentonite clay will expand from the moisture to approximately three times the original size. The operator of the automobile may check to see when the filter becomes ineffective by viewing the filter through the transparent window 32. When the bentonite clay has substantially expanded, the operator may remove the filter 46 by opening the latches 30 and removing the cap 26. The filter 52 may be removed and a new filter installed by removing the screen 40 after the hinge door 35 is opened.

As may be appreciated from the description of the preferred embodiment, the exhaust filter device 10 is a very compact and simple unit that may be readily installed at the end of the exhaust system in an automobile for effectively removing the noxious materials from the exhaust.

It should be understood that the above described embodiment is simply illustrative of the principles of this invention and numerous other embodiments may be readily devised by those skilled in the art that include these principles and fall within the scope thereof. Therefore, only the following claims are intended to define this invention.

What I claim is:

1. An exhaust filter device for an internal combustion engine comprising:
   (a) a housing having interconnecting first and second compartments with the first compartment being cylindrically shaped with an upright orientation and having a concave bottom and a top inlet for receiving the exhaust from the engine and second compartment being cylindrically shaped with an orientation perpendicular to the first compartment and having an outlet for admitting the exhaust to the atmosphere;
   (b) a first filter formed of layers of granulated bentonite clay and activated charcoal mounted in the first compartment supported on the bottom thereof for removing the moisture particles, odors and undesirable fumes from the exhaust;
   (c) a second filter mounted in the second compartment for removing particles and smoke from the exhaust; and
   (d) a single exhaust fan mounted in the second compartment downstream of the filters for drawing the exhaust through the inlet downwardly through the first filter, against the concave bottom, upward through the first filter, and then through the second filter and out the outlet in the second compartment.

2. The exhaust filter device as defined in claim 1 wherein the second filter includes cellulose acetate sponge.

3. Exhaust filter as defined in claim 1 wherein the second filter includes a natural sponge that has been treated with a light vegetable oil.

4. The exhaust filter device as defined in claim 1 wherein the first compartment has a removable cap mounted thereon for facilitating the removal of the first filter when the first filter becomes ineffective.

5. The exhaust filter device as defined in claim 1 wherein arcuate wall segment of the second compartment is hinged to permit the side removal of the second filter when the second filter becomes ineffective.

6. The exhaust filter device as defined in claim 1 wherein the housing has a transparent window formed therein and for viewing the first filter to visually observe when the filter becomes ineffective.

References Cited

UNITED STATES PATENTS

| | | | |
|---|---|---|---|
| 997,442 | 7/1911 | Diffenderfer | 55—279 |
| 1,139,084 | 5/1915 | Templin | 55—380 |
| 1,221,278 | 4/1917 | Bowkus | 55—316 |
| 1,315,163 | 9/1919 | Schwartz | 55—479 |
| 2,707,960 | 5/1955 | Janecke | 55—522 |
| 2,777,759 | 1/1957 | Sokolik | 23—288.3 |
| 2,932,157 | 4/1960 | Villasenor et al. | 55 |
| 3,000,692 | 9/1961 | Duncan et al. | 55—522 |
| 3,091,078 | 5/1963 | Dworak | 23—288.3 |
| 3,224,171 | 12/1965 | Bowman | 55—478 |

HARRY B. THORNTON, *Primary Examiner.*

BERNARD NOZICK, *Assistant Examiner.*

U.S. Cl. X.R.

55—350, 387, 503, 472, 479, 482, 493, 512, 522; 60—29